United States Patent Office 3,469,561
Patented Sept. 30, 1969

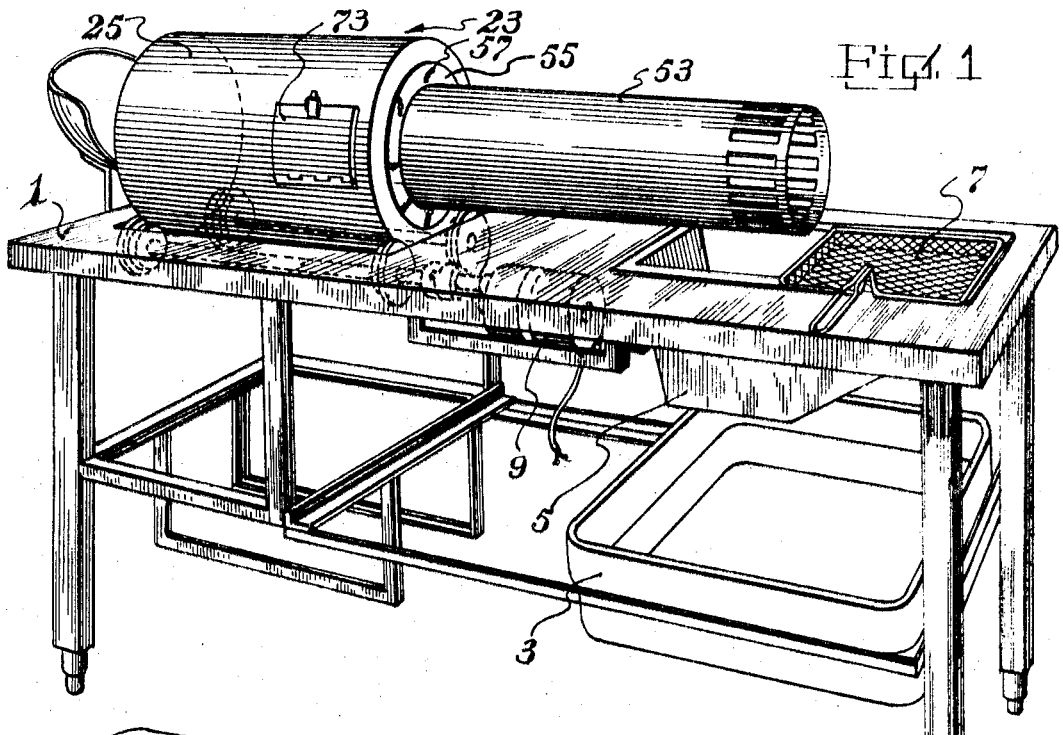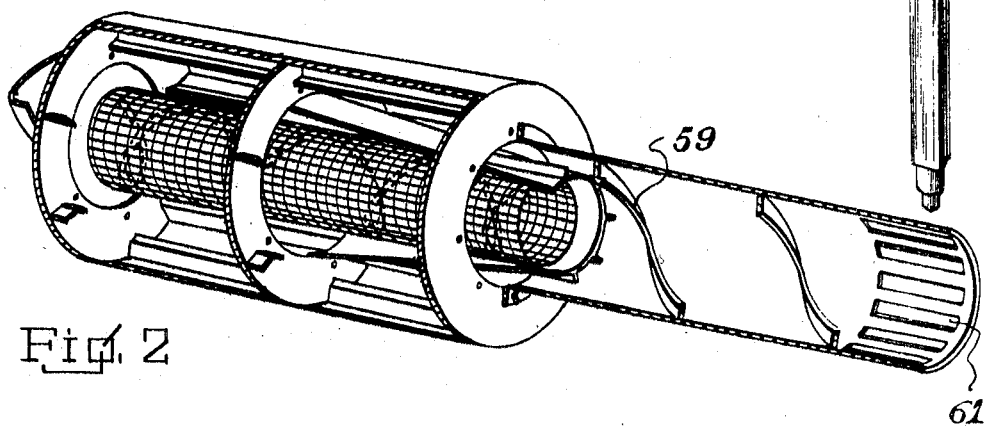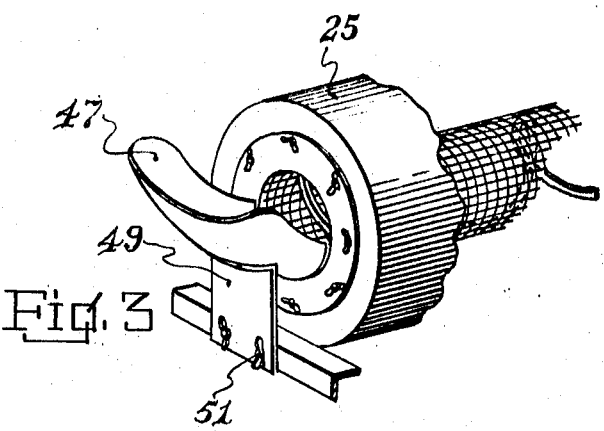

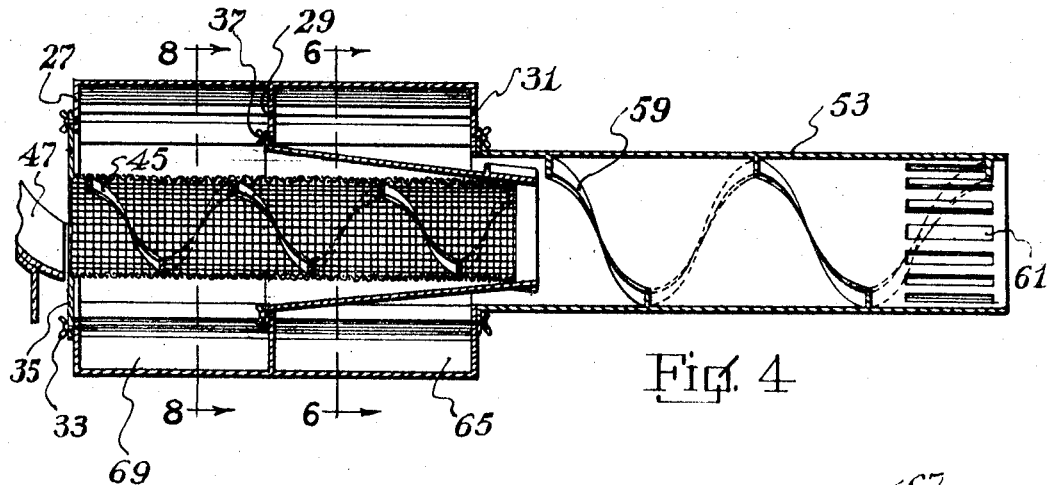
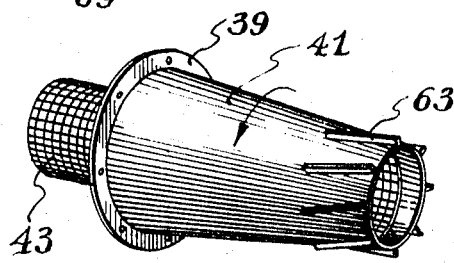
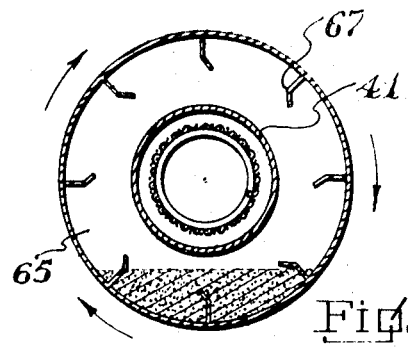
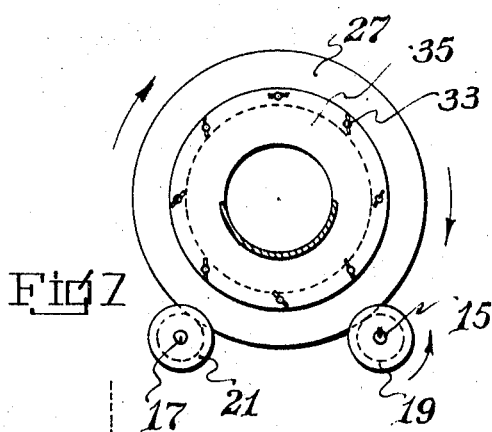
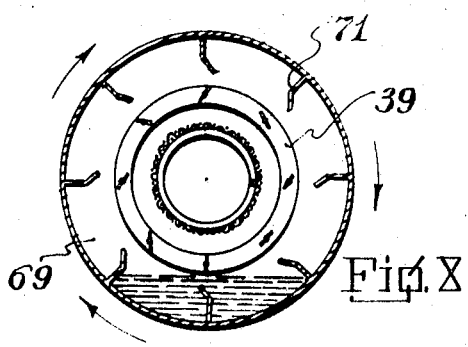
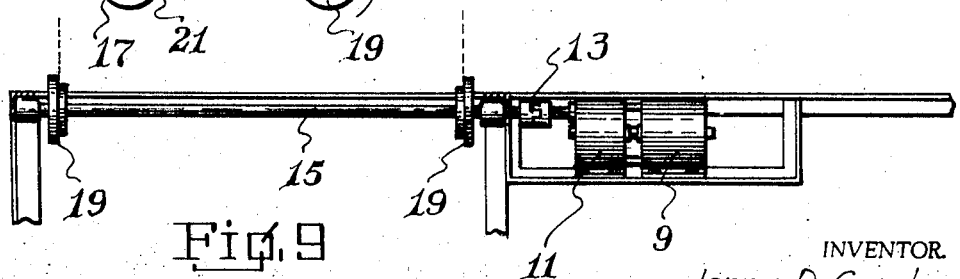
INVENTOR.
Jerry D. Gordon
BY
Young & Thompson
ATTORNEYS

3,469,561
TUMBLING DEVICE INCLUDING PLURAL COATING-SOURCE MEANS
Jerry D. Gordon, 6911 E. 66th St., Tulsa, Okla. 74133
Filed Jan. 12, 1968, Ser. No. 697,408
Int. Cl. A23l 1/31; B05c 5/02
U.S. Cl. 118—16          9 Claims

ABSTRACT OF THE DISCLOSURE

A breader for fried foods comprises a rotating cylinder containing a central screened duct and a draining cone and a final breading and discharge duct. Food to be breaded before frying is fed into the central screened duct and liquid such as milk is supplied to one portion of the cylinder outside the screen, and the flour and seasoning are supplied to another portion of the cylinder outside the screen and outside a conical drainage duct for the liquid. The flour and seasoning are thus fed to the breading and discharge duct by rotation of the cone.

---

The present invention relates to breaders for foods that are to be fried, and will be described and illustrated in connection with a chicken breader in which the cut-up pieces of chicken are first moistened with milk and then sprinkled with flour and seasoning before frying.

It is an object of the present invention to provide a breader which is adapted to be fed continuously with pieces of food and continuously first to drench and then to bread the drenched pieces.

Another object of the present invention is the provision of a breader in which both the moistening agent and the breading are conserved so that no more is used than is necessary in order to effect the breading operation.

Finally, it is an object of the present invention to provide a breader which will be relatively simple and inexpensive to manufacture, easy to assemble and disassemble and to operate, maintain, clean and repair, and rugged and durable in use.

Other objects and advantages of the present invention will become apparent from a consideration of the following description, taken in connection with the accompanying drawings, in which:

FIGURE 1 is a perspective view of an entire breader assembly according to the present invention;

FIGURE 2 is a perspective view, with parts in cross section, of the rotor of the breader of the present invention;

FIGURE 3 is a fragmentary perspective view of the feed end of the breader;

FIGURE 4 is a side cross-sectional view of the rotor of the breader;

FIGURE 5 is a fragmentary perspective view of the milk drainage and flour-feeding cone of the breader;

FIGURE 6 is a cross-sectional view taken on the line 6—6 of FIG. 4;

FIGURE 7 is an elevational view of the breader from the feed end thereof;

FIGURE 8 is a cross-sectional view taken on the line 8—8 of FIG. 4; and

FIGURE 9 is an elevational view with parts broken away of the support and drive means for the breader.

Referring now to the drawings in greater detail, there is shown by way of example a chicken or shrimp breader for use in restaurants or cafeterias or carry-out shops, comprising a table 1 having a flour pan 3 supported thereon to catch excess flour, a chute 5 for the excess flour, and a screened pan 7 for the reception of breaded food pieces. Pan 7 may be lifted from table 1 and immersed in cooking oil or the like to fry the breaded pieces of food. Supported underneath the top of the table 1 is an electric motor 9 provided with a speed reducer 11 and coupling 13 through which is driven a drive shaft 15 mounted for rotation on and slightly below the level of the top of table 1. An idler shaft 17 is also mounted on table 1 at the same level as and parallel to drive shaft 15. Drive rollers 19 are fixedly secured to drive shaft 15, and idler rollers 21 are fixedly secured to idler shaft 17.

Supported for rotation on rollers 19 and 21 for rotation about a horizontal axis is a rotor 23 comprising a hollow cylinder 25 having radially inwardly extending flanges 27, 29 and 31 thereon spaced apart lengthwise of cylinder 25. Rollers 19 and 21 are flanged for the retention and accurate location of rotor 23 on and between them (see FIG. 9). Removably secured to the outer side of flange 27 by means of thumbscrews 33 is a flat annular sheet metal feed ring 35. Detachably secured to flange 29 by means of thumbscrews 37 is a radially outwardly extending annular flange 39 of a hollow truncated sheet metal cone 41 which has its base directed toward the feed end of rotor 23, that is, the left end as seen in FIG. 4, and its smaller end directed toward the discharge end of rotor 23, that is, the right end of FIG. 4. A cylindrical screen 43 is coaxially disposed in rotor 23 and is secured at its feed end to the inner margins of feed ring 35 and is disposed at its discharge end within the small end of cone 41. Screen 43 rotates with rotor 23 and has helical vanes 45 on its internal surface to advance pieces of food to be breaded from the feed end toward the discharge end when rotor 23 turns clockwise as seen in FIGS. 6, 7 and 8. Feed chute 47 is fixedly but detachably secured to table 1 on a standard 49 releasably held on table 1 by thumbscrews 51. Thus, chute 47 does not turn with rotor 23 but instead is adapted continuously or intermittently to feed pieces of food to be breaded into the feed end of screen 43 while rotor 23 is rotating or at rest, but preferably while rotor 23 is rotating.

A breading tube 53 in the form of a cylindrical sheet metal tube coaxial with but of a diameter substantially greater than that of screen 43 has a radially outwardly extending flange 55 thereon which is detachably secured to flange 31 by means of thumbscrews 57. Breading tube 53 has helical vanes 59 on its internal surface disposed in the same sense as the vanes 45, so as further to advance pieces of food from left to right as seen in FIG. 4. Tube 53 also has lengthwise extending slots 61 about the periphery of its discharge end, so that excess flour can fall through these slots and through chute 5 and into flour pan 3, the breaded pieces of food then proceeding on to fall from the discharge end of tubes 53 and into screened pan 7.

The small or discharge end of cone 41 has a plurality of external vanes 63 thereon of special orientation. These vanes are not parallel to the axis of cone 41, but rather have their feed ends, which are the left ends in FIGS. 4 and 5, in advance of their discharge ends, which are the right ends in FIGS. 4 and 5, with respect to the direction of rotation of cone 41 and rotor 23. Remembering that rotor 23 rotates counterclockwise as seen from the feed end, which is the left end of the structure shown in FIG. 5, the orientation of vanes 63 can best be seen from an inspection of FIG. 5.

The portion of rotor 23 that is within cylinder 25 between flanges 29 and 31 but outside of cone 41 is a compartment 65 for the reception and feeding of flour and seasoning. To agitate the dry pulverulent materials in compartment 65, cylinder 25 in this region is provided with a plurality of generally radially inwardly extending baffles 67 on its inner surface. These baffles have the generally cup-shaped configuration shown in FIG. 6, so that they tend to pick up more flour than if they were straight, and to drop it on top of cone 41, so that a portion of the flour dropped on the cone slides along the cone to the feed ends of vanes 63 and is advanced into breading tube 53. The special orientation of vanes 63, however, ensures that the portion of flour and seasoning which does not fall from an upper portion of the discharge end of cone 41 will be directed by gravity back toward flour compartment 65, upon continuing rotation of cone 41, so that most of the flour which is fed from compartment 65 to breading tube 53 will be dropped from a height onto the pieces of food discharged through the discharge end of cone 41. In this way, a better application of flour and seasoning to the food is ensured, with minimum ineffective feed of flour and seasoning through tube 53.

To make the breading stick to the pieces of food, the food is drenched before the dry solids are applied. To this end, a compartment 69 for a liquid such as milk is defined within cylinder 25 between flanges 27 and 29 and on the outer side of screen 43. Baffles 71, which are shaped like baffles 67, are provided about the periphery of compartment 69 on the internal surface of cylinder 25 and tend to pick up milk or other drenching liquid and carry it up and over screen 43 to apply it from above to the food within screen 43.

It is particularly to be noted that cone 41 performs a unique dual function. On its outer surface, as described above, it serves as a breading feeder. But on its inner surface, the lower portion of which is always inclined downwardly toward compartment 69, it serves as a drainboard for excess drenching liquid. Thus, as pieces of food advance through screen 43, from left to right as seen in FIG. 4, they are first drenched with liquid in the left-hand portion of screen 43, and then drained of excess excess liquid in the right-hand portion of screen 43. Upon discharge from the discharge end of screen 43, they are then breaded from above with a dry pulverulent material, and advanced and tumbled through tube 53 in contact with breading material, to make sure that all sides of the pieces are breaded prior to discharge.

The supply of drenching liquid can be renewed simply by pouring it in through the annular opening in feed ring 35. The supply of dry pulverulent breading can be renewed through a door 73 through the side of cylinder 25.

To clean the device, it can simply be lifted off its support rollers 19 and 21 and the thumbscrews 33 can be loosened to remove feed ring 35 and screen 43 as a unit. Thereafter, the thumbscrews 37 for removing cone 41 are accessible. Removal of thumbscrews 51 permits the separation of breading tube 53. The device can thus be easily cleaned and reassembled.

From a consideration of the foregoing disclosure, therefore, it will be evident that all of the initially recited objects of the present invention have been achieved.

Having described my invention, I claim:

1. A breader for pieces of food, comprising a rotor, means for rotating the rotor about a horizontal axis, foraminous means defining a central chamber within the rotor, means in the rotor responsive to rotation of the rotor to apply a drenching liquid to pieces of food in the foraminous chamber to drench the food, means responsive to rotation of the rotor for applying dry pulverulent material to the drenched pieces of food in the rotor to bread the pieces of food, means responsive to rotation of the rotor for discharging thus-breaded pieces of food from the rotor, said means for applying dry pulverulent material comprising a hollow truncated cone whose diameter decreases in the direction of travel of food through the rotor and that rotates with the rotor, said cone encompassing a portion of said foraminous means and providing on its inner surface a drain surface for returning liquid to said means for applying liquid and comprising on its outer surface an inclined feed surface for dry pulverulent material, said cone being spaced within the outer walls of said rotor and defining between the outer surface of the cone and the inner surface of the rotor a compartment for the reception of dry pulverulent material.

2. Apparatus as claimed in claim 1, said foraminous means comprising a foraminous cylinder coaxial with the rotor and having helical vanes on its internal surface for advancing pieces of food axially of the rotor.

3. Apparatus as claimed in claim 1, said means for applying a drenching liquid comprising cup-shaped vanes on the interior of the rotor outside said foraminous means and forming cups opening in the direction of rotation of the rotor that raise and discharge liquid above said chamber.

4. Apparatus as claimed in claim 1 said means for applying dry pulverulent material further comprising cups inside said compartment that open in the direction of rotation of the rotor for raising dry pulverulent material above and discharging it on the upper surface of the cone.

5. Apparatus as claimed in claim 1, and vanes on the outside of the discharge end of the cone for assisting in the feeding of dry pulverulent material to the upper sides of pieces of food discharged from within the cone.

6. Apparatus as claimed in claim 5, said vanes having their ends which are closest to the discharge end of the cone in the rear of their outer ends with respect to the direction of rotation of the cone.

7. Apparatus as claimed in claim 1, including a breading tube coaxial and rotatable with the rotor but of substantially less internal diameter than the diameter of the rotor in the region of said chamber, and means in said breading tube responsive to rotation of the rotor for advancing food away from said chamber.

8. Apparatus as claimed in claim 7, said breading tube having a discharge end from which breaded pieces of food are discharged from the rotor, said discharge end of said breading tube having openings therethrough for the discharge of excess breading material prior to discharge of food from the rotor.

9. Apparatus as claimed in claim 7, said means for advancing food through the breading tube comprising helical vanes disposed about the inside surface of the breading tube.

References Cited

UNITED STATES PATENTS

| 1,819,557 | 8/1931 | Hunter | 118—19 |
|---|---|---|---|
| 2,506,185 | 5/1950 | White | 118—19 |
| 2,577,433 | 12/1951 | Robb | 118—19 |
| 2,572,743 | 10/1951 | Mills | 118—418 X |
| 2,625,903 | 1/1953 | Opie | 118—19 |
| 2,659,338 | 11/1953 | Harrison | 118—16 |
| 2,787,978 | 4/1957 | Faerber | 118—19 |
| 2,860,598 | 11/1958 | Loeshe | 118—418 |
| 3,123,498 | 3/1964 | Braak et al. | 118—19 |
| 3,381,658 | 5/1968 | Porambo | 118—19 |
| 3,408,980 | 11/1968 | Benson | 118—19 |

MORRIS KAPLAN, Primary Examiner

U.S. Cl. X.R.

118—19